US012620848B2

(12) United States Patent  
Kolehmainen

(10) Patent No.: US 12,620,848 B2  
(45) Date of Patent: May 5, 2026

(54) STATOR BODY FOR AN AXIAL FLUX ELECTRIC MACHINE

(71) Applicants: RENAULT S.A.S., Boulogne Billancourt (FR); WHYLOT, Cambes (FR)

(72) Inventor: Jere Kolehmainen, Saint-Aubin-lès-Elbeuf (FR)

(73) Assignees: RENAULT S.A.S., Boulogne Billancourt (FR); WHYLOT, Cambes (FR)

( * ) Notice: Subject to any disclaimer, the term of this patent is extended or adjusted under 35 U.S.C. 154(b) by 240 days.

(21) Appl. No.: 18/560,817

(22) PCT Filed: May 13, 2022

(86) PCT No.: PCT/EP2022/063076  
§ 371 (c)(1),  
(2) Date: Dec. 26, 2023

(87) PCT Pub. No.: WO2022/238570  
PCT Pub. Date: Nov. 17, 2022

(65) Prior Publication Data  
US 2024/0250565 A1     Jul. 25, 2024

(30) Foreign Application Priority Data

May 14, 2021    (FR) ...................................... 2105077

(51) Int. Cl.  
*H02K 1/18* (2006.01)  
*H02K 1/14* (2006.01)  
*H02K 15/022* (2025.01)

(52) U.S. Cl.  
CPC ............... *H02K 1/18* (2013.01); *H02K 1/148* (2013.01); *H02K 1/182* (2013.01); *H02K 15/022* (2013.01)

(58) Field of Classification Search  
CPC ...... H02K 15/022; H02K 1/148; H02K 21/24; H02K 2201/15; H02K 2213/09;  
(Continued)

(56) References Cited

U.S. PATENT DOCUMENTS

2010/0259125 A1    10/2010    Asano et al.  
2011/0037335 A1     2/2011    Jang et al.  
(Continued)

FOREIGN PATENT DOCUMENTS

CN            111181261 A      5/2020  
DE      102015213908 A1      1/2017  
(Continued)

OTHER PUBLICATIONS

Kremer et al, Stator Arrangement for Axial Flow Machine, Aug. 31, 2017, DE 102016203140 (English Machine Translation) (Year: 2017).*

(Continued)

*Primary Examiner* — Alexander A Singh  
(74) *Attorney, Agent, or Firm* — NIXON & VANDERHYE

(57) ABSTRACT

A stator body for an axial-flux electric machine includes: a plate in the form of a ring centered on a longitudinal axis, the plate including an upper face and at least one upper relief projecting from the upper face; and teeth, at least one of which includes a lower relief, a first side of which has a shape complementary to that of a portion of the upper relief, the upper relief being interlocked with the lower relief. The body includes a locking element extending opposite the upper face of the plate and interposed between the tooth and the plate so as to immobilize the upper relief in the position interlocked with the lower relief, and blocking unit blocking the position of the locking element with respect to the plate.

10 Claims, 3 Drawing Sheets

(58) Field of Classification Search
CPC .......... H02K 1/185; H02K 1/16; H02K 3/522;
H02K 1/06; H02K 1/12; H02K 1/18;
H02K 1/182; H02K 21/026
USPC ..... 310/216.086, 216.051, 216.078, 216.049
See application file for complete search history.

(56) References Cited

U.S. PATENT DOCUMENTS

| | | | |
|---|---|---|---|
| 2012/0126653 | A1 | 5/2012 | Yang et al. |
| 2019/0242393 | A1 | 8/2019 | Stetina et al. |
| 2020/0067357 | A1 | 2/2020 | Post et al. |
| 2022/0060065 | A1* | 2/2022 | Wu ........................ H02K 1/148 |

FOREIGN PATENT DOCUMENTS

| | | | | |
|---|---|---|---|---|
| DE | 102016203140 | A1 * | 8/2017 | ............. H02K 1/182 |
| DE | 102019000666 | A1 | 8/2019 | |
| EP | 3331140 | A1 | 6/2018 | |
| EP | 3614530 | A1 | 2/2020 | |
| FR | 2999359 | B1 | 7/2016 | |
| JP | 2006280052 | A | 10/2006 | |
| JP | 2011115014 | A | 6/2011 | |
| WO | 2014114942 | A2 | 7/2014 | |
| WO | 2017121941 | A1 | 7/2017 | |
| WO | 2017178008 | A1 | 10/2017 | |

OTHER PUBLICATIONS

International Search Report for PCT/EP2022/063076, mailed Jul. 8, 2022, 6 pages.
Written Opinion of the ISA for PCT/EP2022/063076, mailed Jul. 8, 2022, 10 pages.

* cited by examiner

STATOR BODY FOR AN AXIAL FLUX ELECTRIC MACHINE

CROSS-REFERENCE TO RELATED APPLICATIONS

This application is the US national stage of PCT/EP2022/063076, filed May 13, 2022 and designating the United States, which claims the priority of FR FR2105077, filed May 14, 2021. The entire contents of each foregoing application are incorporated herein by reference.

TECHNICAL FIELD OF THE INVENTION

The present invention generally relates to the field of electric machines.

More particularly, it relates to a stator body for an axial-flux electric machine comprising:

a ring-shaped plate centred on a longitudinal axis, the plate comprising an upper face and at least one upper relief projecting from the upper face;

teeth at least one of which comprises a lower relief, a first side of which has a shape complementary to that of a portion of the upper relief, the upper relief being interlocked with the lower relief.

The invention finds a particularly advantageous application in electric or hybrid motor vehicles.

It also relates to a stator comprising such a stator body as well as a method for assembling such a stator body.

PRIOR ART

A conventional stator body of an axial-flux electric machine comprises a generally annular plate and teeth circumferentially distributed over an upper face of the plate. To make a stator starting from this body, conductive wire coils are arranged around the teeth. Under the effect of electric currents, the coils generate magnetic fields enabling the stator to set a rotor in motion.

One way to simplify winding of the conductive wire around the teeth is to make the plate and the teeth separately, and then wind the conductive wire around each tooth and finally attach the teeth to the plate. To improve fastening of the teeth to the plate, each tooth may have a relief designed to fit into another relief with a partially complementary shape located on the upper face of the plate.

In particular, a stator body is known from the document WO2017/121941 whose plate has a plurality of radial grooves and wherein each tooth has a rib adapted to fit into one of the radial grooves. Each tooth is then connected to the plate by a slide connection forming a dovetail assembly.

Nonetheless, for the teeth to be able to be put in place (for example the radial insertion thereof in the case of the aforementioned document), the reliefs of the teeth and those of the plate should then fit together, which requires providing for a slight clearance. Hence, fitting cannot be as tight as necessary. The stator body thus obtained is not as rigid as desired meaning that the teeth could actually undergo small movements since fastening thereof to the plate features a slight clearance.

DISCLOSURE OF THE INVENTION

In order to overcome the aforementioned drawback of the prior art, the present invention provides a stator body as defined in the introduction, wherein it is provided that the body comprises a locking element extending opposite the upper face of the plate and interposed between the tooth and the plate so as to immobilise the upper relief in a position interlocked with the lower relief and that the body comprises blocking means blocking the position of the locking element with respect to the plate.

Thus, thanks to the invention, the lower relief of the tooth is securely held interlocked with the upper relief of the plate by the locking element. By blocking the locking element with respect to the plate, the blocking means prevent the detachment of the upper relief and of the lower relief. The body of the stator is then rigid meaning that it is impossible to move the tooth relative to the plate, even slightly.

In particular, the invention allows obtaining a compact and rigid stator body without having to use glue or welding. Of course, gluing or welding operations could be implemented afterwards to apply on the stator body a product allowing increasing thermal conductivity between the components of the stator.

Other advantageous and non-limiting features of the stator body in accordance with the invention, considered separately or according to any technically-feasible combination, are as follows:

the locking element is designed, before assembly, so as to pivot relative to the plate between a released position in which the tooth is movable relative to the plate and a blocking position in which the locking element immobilises the upper relief by holding it interlocked with the lower relief, the blocking means being adapted to hold the locking element in the blocking position;

the blocking means comprise at least one amongst the following elements: a screw, a snap-fitting device;

the locking element comprises a notch in which the upper relief and the lower relief are located, the notch having a lateral edge forming, together with the lower relief and the upper relief, a dovetail assembly wherein the lower relief forms a tenon and wherein the lateral edge of the notch and the upper relief form a mortise;

the upper relief comprises an upper rib and the lower relief comprises a lower rib;

each of the upper rib and the lower rib ha a uniform profile according to a radial direction perpendicular to the longitudinal axis;

the upper relief has a main surface directed towards the plate and the lower relief has a first surface directed towards the tooth, the main surface being in contact with the first surface;

the body comprises a wall rising from a peripheral edge of the plate, on the side of its upper face, the wall having a groove, a portion of which extends lengthwise according to an axis orthogonal to the longitudinal axis, the locking element having a peripheral relief which is inserted into the portion of the groove;

the tooth comprises a lower portion at the lower relief and a upper portion opposite the lower portion, the tooth comprising, at the upper portion, lateral ribs located on either side of the tooth according to an orthoradial direction orthogonal to the longitudinal axis.

The invention also provides a stator comprising a stator body as described hereinabove and conductive wire windings carried by the teeth.

The invention also provides a method for assembling a stator as described hereinabove comprising the following steps of:

positioning the locking element on the upper face of the plate;

positioning the tooth so that the upper relief interlocks with the lower relief;

moving the locking element relative to the plate;

blocking the locking element with respect to the plate by means of the blocking means.

Thus, thanks to the invention, the tooth could be easily set in place with respect to the plate. Afterwards, its position is blocked by moving and blocking the locking element. Indeed, before moving the locking element, the space available around the upper relief of the plate allows interlocking easily the lower relief of the tooth therewith. Afterwards, interlocking is maintained by the locking element which is moved and then blocked.

In practice, the stator body has a plurality of teeth. Once each tooth is positioned, moving and blocking the locking element ensures fastening all teeth at the same time. Hence, the teeth do not need to be fastened one-by-one, which facilitates the industrialisation of the method.

Of course, the different features, variants and embodiments of the invention could be associated with each other in various combinations to the extent that they are not incompatible or exclusive of each other.

BRIEF DESCRIPTION OF THE DRAWINGS

The following description with reference to the appended drawings, given as non-limiting examples, will set out what the invention consists of and how it could be carried out.

In the appended drawings.

DETAILED DESCRIPTION

Figure 1:
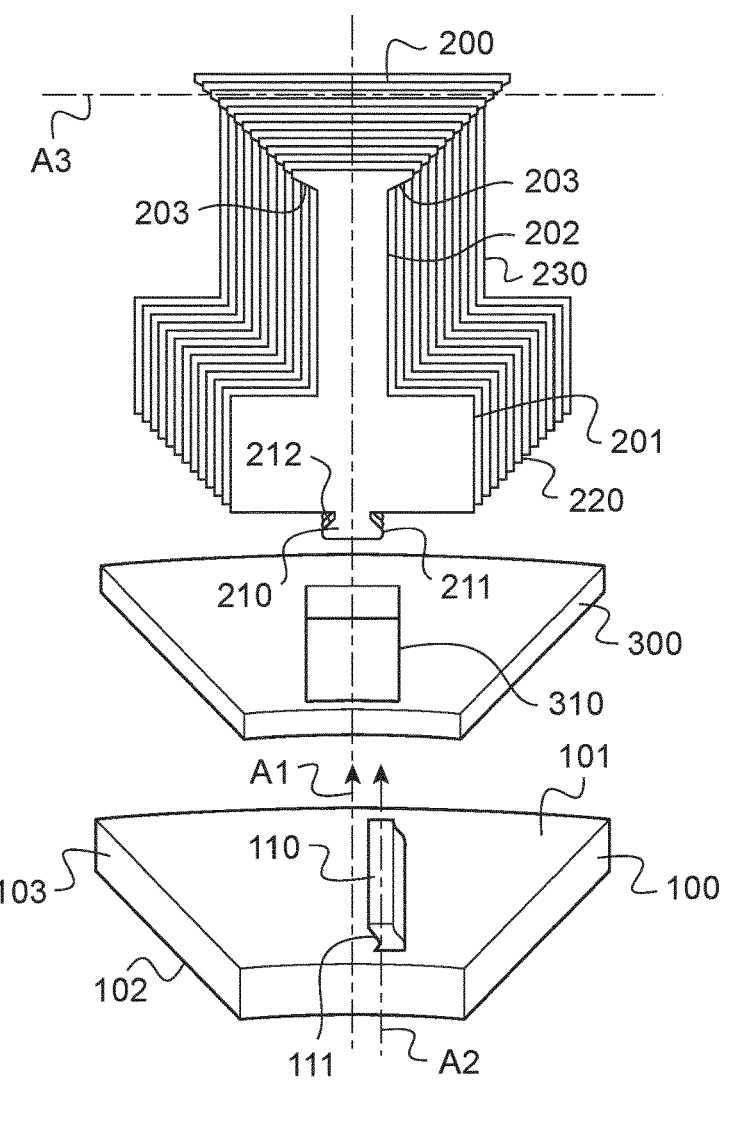
FIG. 1 is a schematic exploded perspective view of a stator body portion according to the invention.

In FIG. 1, there is shown, in exploded view, a portion of a stator body 1 according to the invention. This same portion of body 1 is shown assembled in FIG. 2.

This stator body is intended to be assembled in an axial-flux electric machine, in this case a motor allowing propelling an electric vehicle.

Such an electric machine includes at least one rotor and at least one stator. In practice, it includes more generally a rotor located between two stators.

The rotor generally comprises an annular shaped body which accommodates a plurality of elements with magnetic poles having the same function as permanent magnets.

These elements with magnetic poles consist of magnetic blocks arranged side-by-side in order to form together some kind of a ring in the rotor. Preferably, these elements with magnetic poles consist of small assembled permanent magnets.

In turn, the stators have flattened ring like shapes and are equipped, on their faces located on the rotor side, with teeth around which windings of electrically-conductive wires are wound. When these windings are supplied with electric current, they allow generating a magnetic field so as to make the rotor rotate.

In general, the stators are identical.

In this case, the body 1 of each stator comprises:

a plate 100;

a plurality of teeth 200;

a locking element 300;

blocking means 400.

This body 1, which is more specifically the object of the present invention, comprises a plurality of teeth 200 evenly distributed around a longitudinal axis A1.

Figure 2:
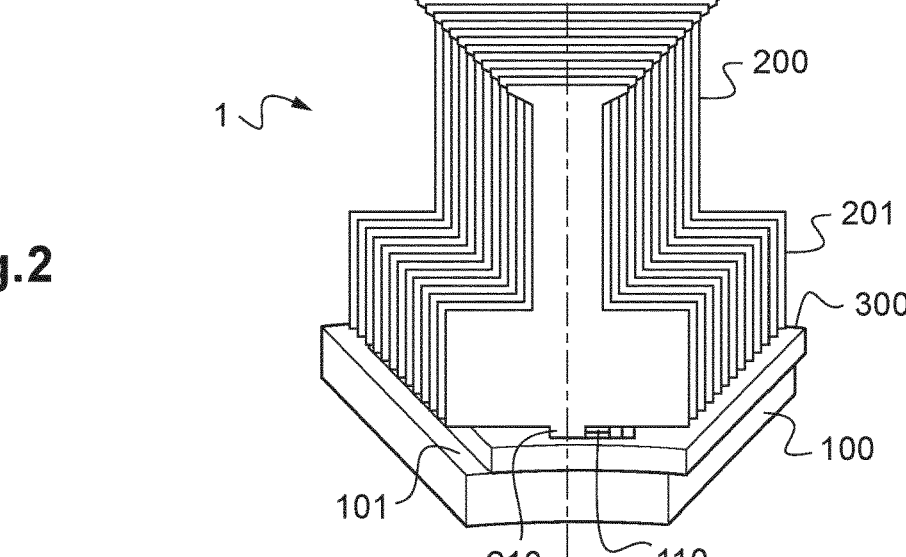
FIG. 2 is an assembled schematic view of the stator body portion of FIG. 1.

In FIGS. 1 and 2, only one angular sector of the body 1 of the stator, which comprises only one tooth, is shown. Only one of the teeth 200 will be described hereafter. In this case, all of the angular portions forming the stator body 1 are identical.

Each tooth 200 generally has a lower face 220 directed on the side of the plate 100, an upper face directed opposite thereto, and a peripheral face 230 directed opposite the longitudinal axis A1.

The plate 100 has a ring-like shape centred on a longitudinal axis A1. The plate 100 herein comprises a circular central recess. In this case, the plate has more specifically an overall shape of a flattened ring whose thickness is smaller than the diameter. In this case, the radial section 103 in a plane containing the longitudinal axis A1 is rectangular as shown in FIG. 1.

For example, the plate 100 is made of aluminium, steel or cast iron. In this case, the plate 100 is made by moulding. Alternatively, the plate 100 may be made by spirally rolling a magnetically-conductive sheet metal whose thickness is for example comprised between 0.2 mm and 0.5 mm. The sheet metal may be grain-oriented or non-grain-oriented.

The plate 100 comprising an upper face 101 (directed towards the rotor). The upper face 101 is generally perpendicular to the longitudinal axis A1. The plate further comprises a lower face 102 opposite and parallel to the upper face 101. The thickness of the plate 100, i.e. its dimension according to the longitudinal axis A1 between the upper face 101 and the lower face 102, is for example comprised between 5 mm and 30 mm. Preferably, the diameter of the plate 100 is comprised between 10 cm and 50 cm.

As shown in FIG. 1, the plate 100 comprises an upper relief 110, projecting over its upper face 101. As described in detail hereafter, the upper relief 110 is designed so as to cooperate with the tooth 200. Thus, the plate 100 herein comprises a plurality of upper reliefs 110, only one of which is shown in FIGS. 1 to 6, each upper relief 110 belonging to an angular portion of the plate 100 and being associated with one of the teeth 200.

The upper relief 110 is herein made integrally in one-piece with the plate 100 during moulding. Hence, the upper relief 110 is not affixed to the plate 100. With the exception of the upper relief 110, the upper face 101 is herein substantially planar.

As clearly shown in FIG. 1, the upper relief 110 herein forms a rectilinear rib. The upper relief 110 extends herein longitudinally in a radial direction A2 perpendicular to the longitudinal axis A1 (the radial direction A2 appears clearly in the sectional views in FIGS. 5 and 6). The upper relief 110 may also extend according to a direction parallel to yet distinct from the radial direction A2, and possibly inclined with respect to this radial direction. Alternatively, the upper relief 110 may extend in a non-rectilinear manner, for example in a sinusoidal manner.

In this case, as illustrated in FIG. 1, the upper relief 110 has a uniform profile according to the direction according to which it extends. This herein means that the section of the upper relief 110 by an orthoradial plane perpendicular to the radial direction A2 (such a plane is for example the plane of FIGS. 5 and 6) is constant over the entire length of the upper relief 110. An orthoradial section of the upper relief 110 is herein visible in FIGS. 5 and 6. Alternatively, the upper relief may have a variable section.

It should be noted hereafter that an orthoradial direction is defined as perpendicular to a principal axis and to a ray extending starting from this axis.

The upper relief 110 has a main surface 111 extending opposite the upper face 101, i.e. directed towards the plate 100, and in an inclined manner. The main surface 111 is arranged such that a direction normal to the main surface 111 and directed towards the outside of the upper relief 110 intersects the plane defined by the upper face 101.

The tooth 200 generally has a right prism like shape, with a trapezoidal section in a plane orthogonal to the longitudinal axis A1. As illustrated in FIGS. 1 and 2, the tooth 200 is manufactured based on a stack of planar sections of a metal sheet. The sheet metal may be made of grain-oriented or non-grain-oriented steel.

As shown in FIG. 1, the tooth 200 comprises a lower portion, called the base 201, extending opposite the plate 100 and an upper portion 202 rising from the base 201 according to the longitudinal axis A1. Hence, the upper portion 202 is located opposite the base 201 according to the longitudinal axis A1. The upper portion 202 is thinner than the base 201 and is intended to carry a conductive wire winding. The tooth 200 herein has a plane of radial symmetry.

For assembly thereof to the plate 100, the tooth 200 comprises a lower relief 210. The lower relief 210 is herein located at the base 201. More specifically, the lower relief 210 projects from the lower face 220 of the tooth 200, which herein extends parallel to the upper face 101 of the plate 100.

As clearly shown in the exploded view of FIG. 1, the lower relief 210 of the tooth 200 is designed so as to fit with the upper relief 110 of the plate 100. For this purpose, the lower relief 210 comprises a first side 211 which has a shape complementary to the shape of the upper relief 110. The lower relief 210 also comprises a second side 212 opposite to the first side 211.

Figure 6:
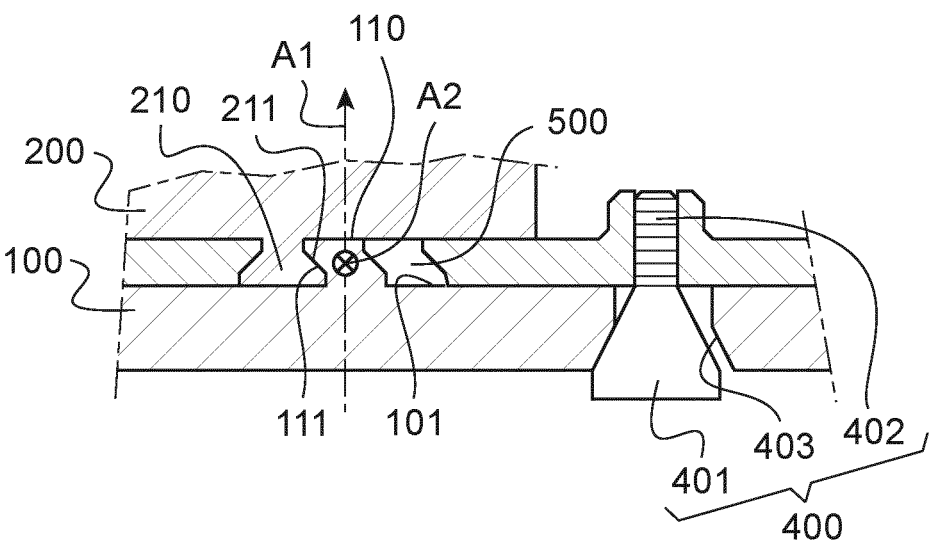
FIG. 6 is a schematic sectional view of the stator body portion of FIG. 5 at the end of assembly thereof.

As shown in FIGS. 2 and 6, once the tooth 200 is mounted on the plate 100, the lower relief 210 is interlocked, herein by its first side 211, with the upper relief 110. Interlocking reduces the number of degrees of freedom of the movement of the lower relief 210 relative to the upper relief 110 and therefore also of the movement of the position of the tooth 200 relative to the plate 100.

The first side 211 of the lower relief 210 herein defines a first surface extending opposite the base 201 of the tooth 200, i.e. directed towards the tooth 200, and in an inclined manner. The first surface of the lower relief 210 is substantially identical to a portion of the main surface 111 of the upper relief 110. Thus, when the lower relief 210 and the upper relief 110 are interlocked, the first surface is herein completely in contact with the main surface 111.

As shown in FIGS. 1 and 2, the lower relief 210 herein forms a rectilinear rib. The lower relief 210 herein extends in the radial direction A2 perpendicular to the longitudinal axis A1. The lower relief 210 may also extend according to a direction parallel to the radial direction A2. Alternatively, the lower relief may extend in a non-rectilinear manner, for example in a sinusoidal manner. In general, the lower relief 210 extends in the same manner as the upper relief 110.

The lower relief 210 and the upper relief 110 herein both forming rectilinear ribs according to the radial direction A2, the term "interlocked" means in particular herein that the upper relief 110 and the lower relief 210 are connected such that a translation of the tooth 200 relative to the plate 100 according to the longitudinal direction A1 is impossible except for a complementary lateral movement of the tooth 200.

In this case, as illustrated in FIG. 1, the lower relief 210 has a uniform profile according to the direction in which it extends, i.e. herein according to the radial direction A2. This means herein that the section of the lower relief 210 by an orthoradial plane perpendicular to the radial direction A2 is constant over the entire length of lower relief 210.

Figure 5:
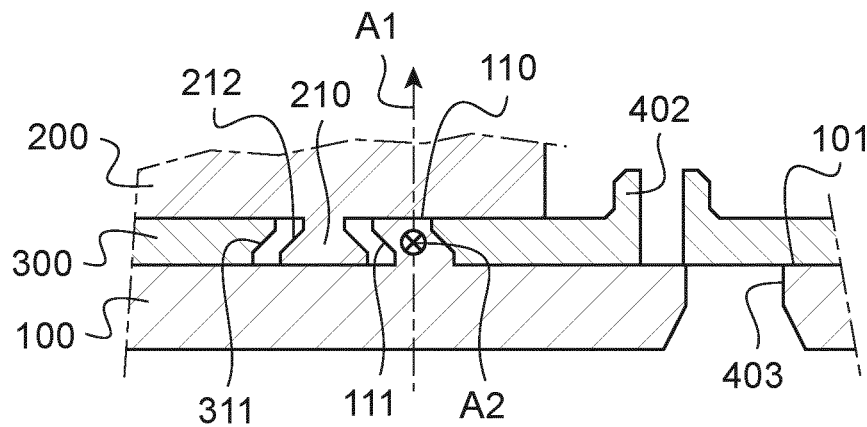
FIG. 5 is a schematic sectional view of a stator body portion of FIG. 1 during assembly thereof.

As shown for example in FIGS. 5 and 6, the orthoradial section of the lower relief 210 herein has a trapezoid, and more particularly an isosceles trapezoid, overall shape. The large base of the trapezoid is herein in contact with the upper face 101 of the plate 100. The small base of the trapezoid forms the junction with the base 201 of the tooth 200. Alternatively, the section of the lower relief may have another shape, for example an ovoid shape.

In this case, the ribs formed by the lower relief 210 and the upper relief 110 have the same lengths. Alternatively, they could have different lengths. In particular, it could be provided that the lower relief 210 has a length smaller than that of the upper relief 110.

The objective will then be to keep the lower relief 210 and the upper relief 110 interlocked.

For this purpose, as shown in FIG. 2, it is provided that the locking element 300 extends against the upper face 101 of the plate 100. In this case, the locking element 300 has a disk-like shape whose diameter is substantially identical to that of the upper face 101. In this case, the locking element extends radially towards the longitudinal axis A1 up to the circular central recess of the plate 100. The thickness of the locking element 300 is herein smaller than that of the plate 100.

As shown in FIG. 2, the locking element 300 is interposed between the tooth 200 and the plate 100. Thus, the locking element 300 is in contact both with the tooth 200, more specifically with the base 201 of the tooth 200, and with the plate 100.

As shown in FIGS. 2, 5 and 6, the locking element 300 is herein sandwiched between the plate 100 and the tooth 200 according to the longitudinal axis A1. This means that an upper contact point between the locking element 300 and the tooth 200 is aligned according to the longitudinal axis A1 with a lower contact point between the locking element 300 and the plate 100. In other words, the plate 100, the locking element 300 and the tooth 200 form a stack according to the longitudinal axis A1.

More specifically, the locking element 300 is interposed between the lower face 220 of the tooth 200 and the upper face 101 of the plate 100. The locking element 300 herein extends in a plane parallel to that of the plate 100 and more particularly to that of the main face 101 of the plate 100.

When the stator body 1 is assembled, as is the case in FIGS. 2 and 6, the locking element 300 is positioned so as to hold, i.e. herein to immobilise, the upper relief 110 interlocked with the lower relief 210. In this case, this means in particular that the locking element 300 opposes a separation of the lower relief 210 and the upper relief 110 according to an orthoradial direction, for example according to the orthoradial direction A3 shown in FIG. 1.

This position of the locking element 300, when the stator body 1 is assembled, is hereafter so-called the blocking position. The blocking position, shown in FIG. 6, is characterised by the fact that the lower relief 210 is immobilised between the upper relief 110 of the plate 100 and the locking element 300, i.e. herein pinched or clamped between the upper relief 110 and the locking element 300. The radial holding of the lower relief 110, and therefore of the tooth 200, is herein ensured by pinching of the lower relief 110, i.e. by friction forces and by the shape of the locking element 300 (in particular by the notch 310 and/or by the locking element 300 described hereinafter).

The locking element 300 is designed so as to pivot relative to the plate 100 between the locking position and a released position in which the tooth 200 is movable relative to the plate 100. By "movable", it should be herein understood that the lower relief 210 could be placed in contact with or separated from the upper relief 110. The locking element 300 is herein more specifically designed so as to perform a rotational movement about the longitudinal axis A1. Thus, the locking element 300 is movable in the plane according to which it extends, i.e. the plane parallel to the plate 100.

In the released position, a free space, located opposite the upper face 111 of the upper relief 110, allows interlocking the lower relief 210 and the upper relief 110. In the released position, the tooth 200 is therefore movable relative to the plate 100 meaning that it can be mounted on or removed from the plate 100.

The locking element 300 herein comprises a through notch 310, with a closed contour. The notch 310, which is for example shown in FIG. 1, accommodates the upper relief 110 and the lower relief 210. In this case, the notch 310 completely surrounds the reliefs 110, 210 in the plane of the locking element 300, i.e. herein in a plane perpendicular to the longitudinal axis A1. The notch 310 has a length, according to a radial direction, larger than that of the upper relief 110.

Alternatively, the notch may surround the reliefs only partially, for example by having a U-shaped contour open towards the periphery of the body. The locking element then has a star-like shape with a hub from which a plurality of branches extends. Again, alternatively or complementarily, the notch may have a U-shaped contour open towards the longitudinal axis A1.

The notch 310 comprises a lateral edge 311 which, in the blocking position, is in contact with the lower relief 210 of the tooth 200. As shown for example in FIG. 5, the lateral edge 311 has a shape complementary to the shape of the second side 211 of the lower relief 210. Thus, in this case, the lateral edge 311, the lower relief 210 and the upper relief 110 form a dovetail assembly as shown in section in FIG. 6. In this assembly, the lower relief 210 forms a tenon and the lateral edge 311 and the upper relief 110 form a mortise.

Preferably, the locking element 300 is made of a non-magnetic material. For example, the locking element 300 is made of non-magnetic stainless steel, of aluminium or of a composite material. Preferably, the locking element is made of an alloy of aluminium and silicon so as to have both high strength and lightweight. In this case, the locking element 300 is made by moulding. Alternatively, the locking element 300 could be made from a thick metal strip (by machining or stamping) or from several superimposed metal sheets. It could also be made by rolling a sheet metal and then gluing or welding the sheet metal.

In his case, the locking element 300 comprises a plurality of notches 310, each notch 310 being associated with one of the upper reliefs 110 of the body 1. For example, the notches 300 are made by stamping or are for example directly moulded during the manufacture of the disk.

Preferably, keying means are provided for allowing ensuring, when mounting the locking element 300 on the plate 100, that this element properly bears against the plate.

Figure 3:
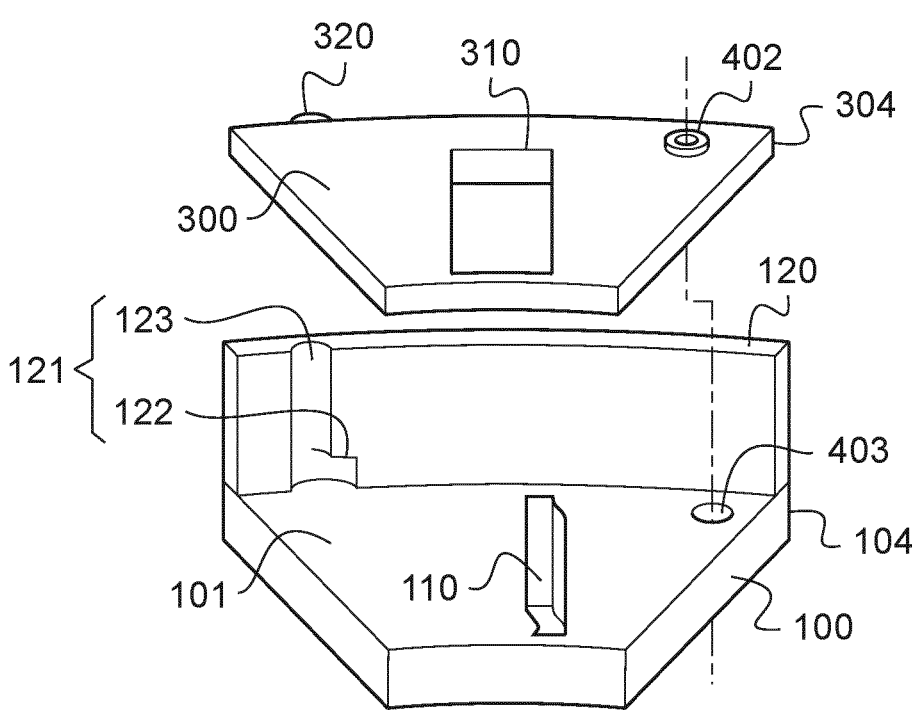
FIG. 3 is a schematic exploded perspective view of a portion of a plate and of a locking element according to a first embodiment of the invention.
Figure 4:
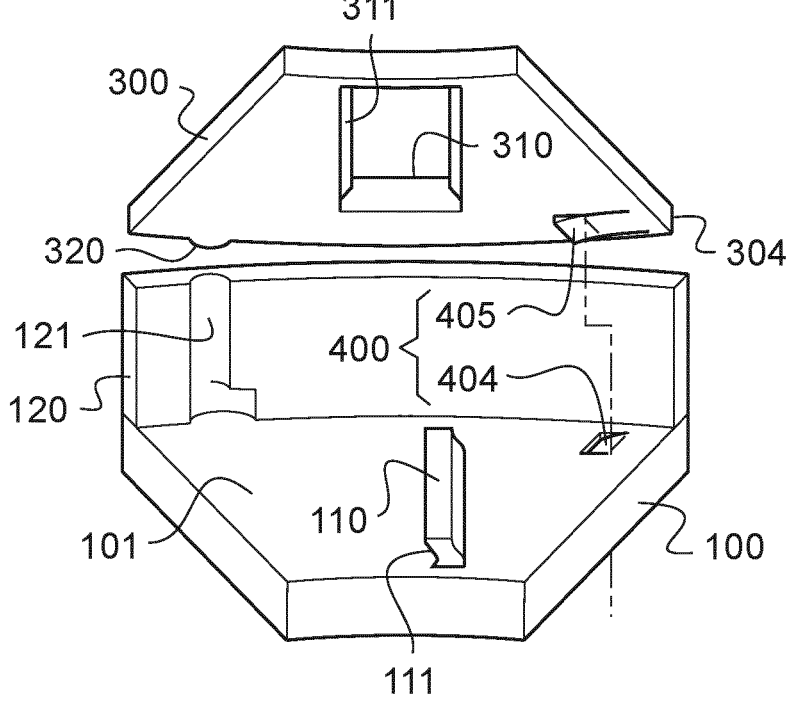
FIG. 4 is a schematic exploded perspective view of a portion of a plate and of a locking element according to a second embodiment of the invention.

In some embodiments shown in FIGS. 3 and 4, the body 1 comprises a wall 120 which borders the plate 100. The wall 120, herein cylindrical shaped, rises from a peripheral edge 104 of the plate 100. The wall 120 herein rises on the side of the upper face 101. The wall 120 is herein designed so as to be at least partially in contact with the peripheral face 230 of the tooth 200 (although this feature is not necessarily used).

The wall 120 which borders the plate 100 has, recessed in its internal face directed towards the longitudinal axis A1, at least one L-shaped groove 121, a first vertical portion 123 of which extends from the upper edge of the wall 120 and a second horizontal portion 122 of which extends from the lower end of the vertical portion 123, orthogonal to the longitudinal axis A1.

In these embodiments shown in FIGS. 3 and 4, it is provided that the locking element 300 comprises at least one peripheral relief 320 which projects from its peripheral edge 304 and which is inserted into the groove 121. When the locking element 300 is in the blocking position, the peripheral relief 320 is inserted into the horizontal portion 123 of the groove 121. This insertion allows keeping the locking element 300 pressed against the upper face 101.

Once the locking element 300 is in the blocking position on the plate 100, it is necessary to lock the rotational mobility of this element about the longitudinal axis A1 in order to ensure that the lower relief 210 remains blocked between the lateral edge 311 of the notch 310 and the main face 111 of the upper rib 110 of the plate 100.

The blocking means 400 used to this end may be of all kinds. For example, the blocking means 400 may be affixed to the plate 100 and/or the locking element 300. The blocking means 400 may also be manufactured integrally in one-piece with the plate 100 and/or the locking element 300.

In any case, the blocking means 400 herein allow fastening the locking element 300 in the blocking position, i.e. in this case preventing the pivoting of the locking element 300 from the blocking position towards the released position.

Different embodiments of the blocking means 400 are for example schematised in FIGS. 3 to 6.

In a first embodiment shown in FIGS. 3, 5 and 6, the blocking means 400 comprise at least one screw 401. FIGS. 3 and 5 do not show the screw 401 itself but illustrate a thread 402 intended to screw the latter.

In this case, as shown in FIG. 6, the thread 402 is provided in the locking element 300 and an orifice 403 is provided in the plate so that the screw 401, herein its head, crosses the plate 100. Conversely, alternatively, the thread may be provided in the plate and the screw may cross the locking element. In this case, screw 401 is screwed according to the longitudinal axis A1.

The threaded hole and the orifice are located so as to exactly or substantially align when the locking element is in the blocking position, so that the screw 402 then allows keeping the locking element 300 pressed against the upper face 101.

Preferably, as shown in FIG. 6, this alignment is not exact and the head of the screw is conical, so that screwing of the screw allows constraining the lateral edge 311 of the notch 310 against the upper rib 110 of the plate 100, which ensures complete blocking of the locking element 300 and of the tooth 200 with respect to the plate 100.

In a second embodiment shown in FIG. 4, the blocking means comprise a snap-fitting device 404, 405. The snap-fitting device 404, 405 enables pivoting of the locking element 300 from the released position to the blocking position but, once snap-fitted, prevents it from pivoting from the blocking position to the released position.

The snap-fitting device 404, 405 comprises a recessed relief 404 and a projecting relief 405 arranged so as to fit into the recessed relief 404. In this case, the recessed relief 404 is located on the plate 100 and the projecting relief 405 is located on the locking element 300. Conversely, alternatively, the projecting relief may be located on the plate and the recessed relief on the locking element. Still alternatively, the snap-fitting device may be arranged between the locking element and the wall.

In this case, the projecting relief 405 is formed by a cutout in the locking element 300, i.e. by a partial cut of the locking element 300 across its thickness. Afterwards, the cut portion is twisted out of the plane of the locking element 300.

In these two embodiments, to reduce the stresses exerted thereon, the blocking means 400 are positioned at the periphery of the body 1. For example, the blocking means 400 may comprise one single screw 401 or one single clip 405. Preferably, the blocking means 400 are multiple and distributed at several locations of the body 1.

As a variant of these embodiments, the blocking means could consist of a variable thickness of the locking element at the notches so that by pivoting the locking element from the released position to the blocked position, the lateral edge of the notch is forcibly engaged between the base of the tooth and the plate. Still alternatively, the blocking means could comprise a thread formed in the central bore of the plate and a tapped central pin projecting under the locking element, which would allow screwing these two elements into each other. The blocking means 400 could also be included in a part external to the stator.

Still alternatively, the blocking means could be formed by locally deformed areas of the edge of the locking element 300.

According to another variant, the blocking means could be formed by an adhesive or by welding spots.

Regardless of the considered embodiment, in the blocking position, a channel 500 is defined between the base 201 of the tooth 200, the plate 100 and the locking element 300. As shown in FIG. 6, this channel 500 forms a free space. Advantageously, it is here provided for making a cooling liquid, for example oil, flow in this channel 500 when the stator is in operation to reduce heating thereof.

Alternatively, this channel 500 could be filled with glue or varnish or with any other material ensuring good thermal conductivity and allowing achieving a better blocking of the locking element 300.

Regardless of the considered embodiment, lateral ribs 203, shown for example in FIG. 1, are herein provided on either side, according to an orthoradial direction A3 orthogonal to the longitudinal axis A1 and to the radial direction A2, of the upper portion 202 of the tooth 200. The lateral ribs 203 extend opposite other lateral ribs 203 of the other teeth 200. The lateral ribs 203 facilitate the circulation of the magnetic flux between the teeth 200 and the rotor, thereby improving the performances of the stator.

The method for assembling of the body 1 of the stator could now be described. According to the invention, this method mainly comprises the following steps of:

positioning the locking element 300 on the upper face 101 of the plate 100;
  positioning the tooth 200 so that the lower relief 210 interlocks with the upper relief 110;
  moving the locking element 300 relative to the plate 100;

blocking the locking element 300 with respect to the plate 100 by means of the blocking means 400.

During the step of positioning the locking element 300, the latter is affixed against the upper face 101, in the released position. In the embodiments shown in FIGS. 3 and 4, during this step, the projecting relief 320 on the locking element 300 is inserted into the vertical portion 123 of the groove 121 and slides in the latter.

During the next step of positioning the tooth 200, illustrated in FIG. 5, the free space at the upper relief 110 allows positioning the lower relief 210 opposite the upper relief 110. Thus, the lower relief 210 is positioned so as to be able to be interlocked with the upper relief 110.

In this step, the teeth are pushed inwards, bearing against the internal edge of the notches 310.

During the step of positioning the tooth 200, the lower relief 210 may be positioned so as to be interlocked with the upper relief 110 yet without being in contact with the upper relief 110. Thus, at the end of the step of positioning the tooth 200, the upper relief 110 and the lower relief 210 face each other at a short distance. This situation is shown in FIG. 5. This embodiment of the method according to the invention allows positioning all of the teeth of the stator in one-piece at once on the plate 100. Thus, the teeth of the stator may be made integrally in one-piece and placed together on the plate 100, or be segmented and placed one-by-one on the plate 100, before or after winding thereof, or segmented, wound then reassembled so as to be placed together on the plate 100.

Interlocking the upper relief 110 with the lower relief 210 is then carried out in the next step of moving the locking element 300 relative to the plate 100. By moving, the locking element 300 drives the lower relief 210 against the upper relief 110 so as to interlock them. In FIG. 5, this step is schematised by a movement towards the right of the locking element 300. Once in contact with lower relief 210, the locking element 300 moves the lower relief 210, and therefore the tooth 200, until the lower relief 210 abuts against the upper relief 110 (FIG. 6).

During the step of positioning the tooth 200, the lower relief 210 may also be positioned in contact with the upper relief 110, i.e. interlocked with the latter. During the step of moving the locking element 300, the latter abuts against the lower relief 210 without moving it.

In any case, during the step of moving the locking element 300, the latter is pivoted from the released position to the blocking position. In FIGS. 3 and 4, pivoting of the locking element 300, herein its rotation about the longitudinal axis A1, is schematised by an arrow pointing from the left to the right.

In the first and second embodiment, reaching the blocking position comprises the alignment of the blocking means 400, herein according to the longitudinal axis A1. The alignment is carried out between the thread 402 and the orifice 403 in the first embodiment and between the recessed relief 404 and the projecting relief 405 in the second embodiment.

Finally, in the last step, the locking element 300 is fixed in the blocking position by the blocking means 400. When the snap-fitting device 404, 405 is used, the step of blocking the locking element 300 is carried out automatically once the disk of the locking element 300 has reached the blocking position. When using the screw 401, the step of blocking the locking element 300 comprises screwing the screw 401, as illustrated in FIG. 6.

It should then be noted that the blocking means assist in blocking the teeth in the radial position, so that they cannot move outwards. Complementarily, this blockage may also be completed with glue, a belt surrounding the teeth, etc.

The present invention is in no way limited to the described and illustrated embodiments, but a person skilled in the art will be able to bring in any variant in accordance with the invention. Thus, for example, the tooth may have two lower reliefs interlocking with two upper reliefs of the plate.

The invention claimed is:

1. A stator body for an axial-flux electric machine comprising:
   a ring-shaped plate centered on a longitudinal axis, the ring-shaped plate comprising an upper face and at least one upper relief projecting from the upper face;
   teeth at least one of which comprises a lower relief a first side of which has a shape complementary to that of a portion of the upper relief, the upper relief being interlocked with the lower relief; wherein the body comprises a locking element extending opposite the upper face of the ring-shaped plate and interposed between the tooth and the ring-shaped plate so as to immobilize the upper relief in an interlocked position with the lower relief and wherein the body comprises blocking means blocking the position of the locking element with respect to the ring-shaped plate;
   wherein the locking element comprises a notch in which the upper relief and the lower relief are located, the notch having a lateral edge forming, together with the lower relief and the upper relief, a dovetail assembly wherein the lower relief forms a tenon and wherein the lateral edge of the notch and the upper relief form a mortise.

2. The stator body according to claim 1, wherein the locking element is designed, before assembly, to pivot relative to the ring-shaped plate between a released position in which the tooth is movable relative to the ring-shaped plate and a blocking position in which the locking element immobilizes the upper relief by holding the upper relief interlocked with the lower relief, the blocking means being adapted to hold the locking element in the blocking position.

3. The stator body according to claim 1, wherein the blocking means comprise at least one amongst the following elements:
   a screw;
   a snap-fit device.

4. The stator body according to claim 1, wherein the upper relief comprises an upper rib and wherein the lower relief comprises a lower rib.

5. The stator body according to claim 4, wherein each of the upper rib and the lower rib has a uniform profile according to a radial direction perpendicular to the longitudinal axis.

6. The stator body according to claim 4, wherein the upper relief has a main surface directed towards the ring-shaped plate and wherein the lower relief has a first surface directed towards the tooth, the main surface being in contact with the first surface.

7. The stator body according to claim 1, wherein the body comprises a wall rising from a peripheral edge of the ring-shaped plate, on the side of the ring-shaped plate's upper face, the wall having a groove a portion of which extends lengthwise according to an axis orthogonal to the longitudinal axis, the locking element having a peripheral relief which is inserted into the portion of the groove.

8. A stator comprising a stator body according to claim 1 and conductive wire windings carried by the teeth.

9. A method for assembling a stator body according to claim 1, comprising the following steps of:
   positioning the locking element on the upper face of the ring-shaped plate;
   positioning the tooth so that the upper relief interlocks with the lower relief;
   moving the locking element relative to the ring-shaped plate;
   blocking the locking element with respect to the ring-shaped plate by means of the blocking means.

10. The method according to claim 9, wherein the locking element pivots relative to the ring-shaped plate between a released position in which the tooth is movable relative to the ring-shaped plate and a blocking position in which the locking element immobilizes the upper relief by holding the upper relief interlocked with the lower relief, the blocking means being adapted to hold the locking element in the blocking position.

* * * * *